United States Patent
Chang (10) Patent No.: US 8,694,984 B2
(45) Date of Patent: Apr. 8, 2014

(54) MEMORY APPARATUS AND METHOD OF UPDATING FIRMWARE OF THE MEMORY APPARATUS

(75) Inventor: Sil Wan Chang, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 993 days.

(21) Appl. No.: 12/753,222

(22) Filed: Apr. 2, 2010

(65) Prior Publication Data

US 2010/0257519 A1 Oct. 7, 2010

(30) Foreign Application Priority Data

Apr. 3, 2009 (KR) .................. 10-2009-0029092

(51) Int. Cl.
*G06F 9/445* (2006.01)

(52) U.S. Cl.
USPC .......................................... 717/169; 717/170

(58) Field of Classification Search
USPC ......................................................... 717/169
See application file for complete search history.

(56) References Cited

U.S. PATENT DOCUMENTS

| | | | | |
|---|---|---|---|---|
| 5,414,751 A * | 5/1995 | Yamada | ................... | 455/418 |
| 5,623,604 A * | 4/1997 | Russell et al. | ................ | 717/167 |
| 5,701,492 A * | 12/1997 | Wadsworth et al. | ......... | 717/173 |
| 5,960,445 A * | 9/1999 | Tamori et al. | ............... | 717/168 |
| 6,009,497 A * | 12/1999 | Wells et al. | .................. | 711/103 |
| 6,055,632 A * | 4/2000 | Deegan et al. | ............... | 713/100 |
| 6,360,362 B1 * | 3/2002 | Fichtner et al. | .............. | 717/168 |
| 7,047,283 B1 * | 5/2006 | Kim | ............................... | 709/220 |
| 7,200,713 B2 * | 4/2007 | Cabot et al. | .................. | 711/108 |
| 7,555,750 B1 * | 6/2009 | Lilley | ............................. | 717/168 |
| 7,657,886 B1 * | 2/2010 | Chen et al. | .................... | 717/170 |
| 7,797,696 B1 * | 9/2010 | Nallagatla et al. | ........... | 717/168 |
| 7,953,901 B2 * | 5/2011 | Nishikawa | ........................ | 710/8 |
| 7,958,502 B2 * | 6/2011 | Motta et al. | ................... | 717/168 |
| 7,984,432 B2 * | 7/2011 | Edlund | ........................ | 717/168 |
| 8,032,740 B2 * | 10/2011 | Haverkamp et al. | ............. | 713/2 |
| 8,332,572 B2 * | 12/2012 | Tzeng | .......................... | 711/103 |
| 2002/0129186 A1 * | 9/2002 | Emerson et al. | .............. | 710/302 |
| 2002/0170050 A1 * | 11/2002 | Fiorella et al. | ................ | 717/168 |
| 2003/0154471 A1 * | 8/2003 | Teachman et al. | ............ | 717/171 |
| 2004/0158828 A1 * | 8/2004 | Zimmer et al. | ............... | 717/168 |
| 2005/0102660 A1 * | 5/2005 | Chen et al. | .................... | 717/168 |
| 2005/0160217 A1 * | 7/2005 | Gonzalez et al. | ................. | 711/6 |
| 2005/0177023 A1 * | 8/2005 | Abe | ............................... | 600/101 |
| 2005/0216721 A1 * | 9/2005 | Zimmer et al. | ................... | 713/2 |
| 2006/0020936 A1 * | 1/2006 | Wyatt | .......................... | 717/162 |
| 2007/0169098 A1 | 7/2007 | Kikuchi | | |
| 2007/0204144 A1 * | 8/2007 | Gafken et al. | .................... | 713/2 |

(Continued)

FOREIGN PATENT DOCUMENTS

EP 359235 A2 * 3/1990 ............. G06F 12/06
JP 2007518166 7/2007

(Continued)

*Primary Examiner* — Wei Zhen
*Assistant Examiner* — Matthew Brophy
(74) *Attorney, Agent, or Firm* — Myers Bigel Sibley & Sajovec, P.A.

(57) ABSTRACT

A method of updating firmware that is included in a memory apparatus that includes first and second volatile memories and a non-volatile memory, can be provided by storing new firmware in the second volatile memory when old firmware is loaded into the first volatile memory and determining on a component basis which of a plurality of components of the old firmware is an updated component in the new firmware.

13 Claims, 10 Drawing Sheets

(56) References Cited

U.S. PATENT DOCUMENTS

2008/0109798 A1* 5/2008 Gavens et al. ................. 717/168
2009/0007089 A1* 1/2009 Rothman et al. .............. 717/168
2009/0249320 A1* 10/2009 Su et al. ........................ 717/168

FOREIGN PATENT DOCUMENTS

| JP | 2007-193596 | 8/2007 |
|----|-------------|--------|
| JP | 2008-077474 | 4/2008 |
| KR | 1020070003808 A | 1/2007 |

* cited by examiner

MEMORY APPARATUS AND METHOD OF UPDATING FIRMWARE OF THE MEMORY APPARATUS

CROSS-REFERENCE TO RELATED APPLICATIONS

This application claims priority under 35 U.S.C. §119 to Korean Patent Application No. 10-2009-0029092, filed on Apr. 3, 2009, in the Korean Intellectual Property Office, the disclosure of which is incorporated herein in its entirety by reference.

BACKGROUND

Embodiments of the present invention relate to a memory apparatus and a method of updating the firmware of the memory apparatus, and more particularly, to an apparatus and method capable of reducing a firmware update time through selective initialization of context information.

In memory apparatuses (device) including both a non-volatile memory and a volatile memory, like Solid State Drives/Disks (SSDs), when a firmware is loaded on the volatile memory, the firmware existing on the volatile memory needs predetermined information in order to drive the memory apparatus. The predetermined information may be referred to as context information. The context information may be mapping information for managing the non-volatile memory or caching information (or buffering information) that is used due to the different speeds of the volatile and non-volatile memories.

In the conventional art, the entire context information should be initialized to update the firmware.

SUMMARY

The present invention provides a memory apparatus and a method capable of minimizing initialization, namely, storage and recovery, of context information being information used to maintain each component of a firmware by comparing the version of an old firmware with the version of a new firmware when the memory apparatus performs firmware updates.

According to some aspects of the present invention, a method of updating firmware that is included in a memory apparatus that includes first and second volatile memories and a non-volatile memory, can be provided by storing new firmware in the second volatile memory when old firmware is loaded into the first volatile memory and determining on a component basis which of a plurality of components of the old firmware is an updated component in the new firmware.

According to some aspects of the present invention, a method of updating firmware included in a memory apparatus that includes a first volatile memory, a second volatile memory, and a non-volatile memory, can be provided by updating firmware located in at least one volatile memory by updating only a part of context information corresponding to the firmware.

According to some aspects of the present invention a memory apparatus can include at least one volatile memory and a non-volatile memory, where the memory apparatus updates firmware located in the at least one volatile memory by updating only a part of context information corresponding to the firmware.

BRIEF DESCRIPTION OF THE DRAWINGS

Exemplary embodiments of the present invention will be more clearly understood from the following detailed description taken in conjunction with the accompanying drawings in which.

DETAILED DESCRIPTION OF THE EMBODIMENTS

The present invention is described more fully hereinafter with reference to the accompanying drawings, in which embodiments of the invention are shown by way of example. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art.

It will be understood that when an element is referred to as being "connected to," "coupled to" or "responsive to" (and/or variants thereof) another element, it can be directly connected, coupled or responsive to the other element or intervening elements may be present. In contrast, when an element is referred to as being "directly connected to," "directly coupled to" or "directly responsive to" (and/or variants thereof) another element, there are no intervening elements present. Like numbers refer to like elements throughout. As used herein, the term "and/or" includes any and all combinations of one or more of the associated listed items and may be abbreviated as "/".

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising" (and/or variants thereof), when used in this specification, specify the presence of stated features, integers, steps, operations, elements, and/or components, but do not preclude the presence or addition of one or more other features, integers, steps, operations, elements, components, and/or groups thereof. In contrast, the term "consisting of" (and/or variants thereof) when used in this specification, specifies the stated number of features, integers, steps, operations, elements, and/ or components, and precludes additional features, integers, steps, operations, elements, and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present application, and will not be interpreted in an idealized or overly formal sense unless expressly so defined herein.

Figure 1A:
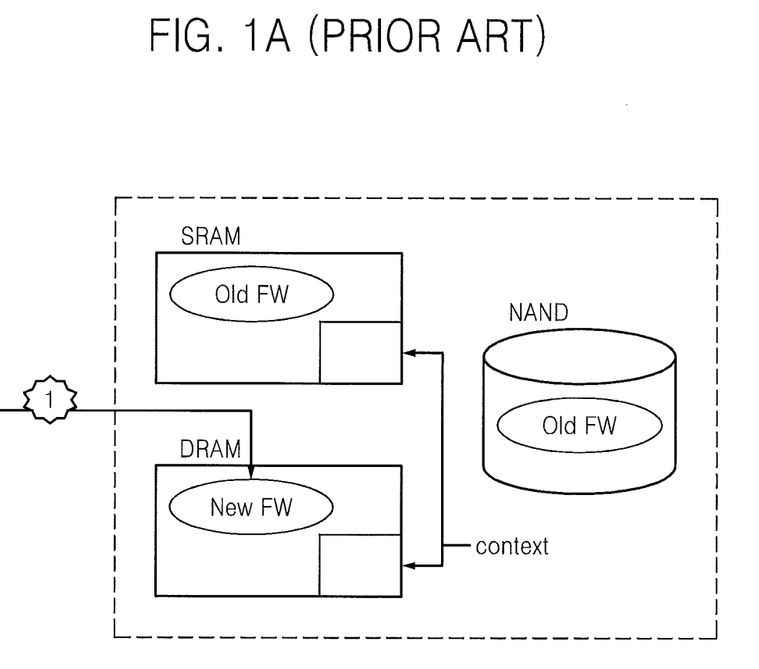
FIGS. 1A through 1C are diagrams for explaining a conventional firmware updating method.
Figure 1B:
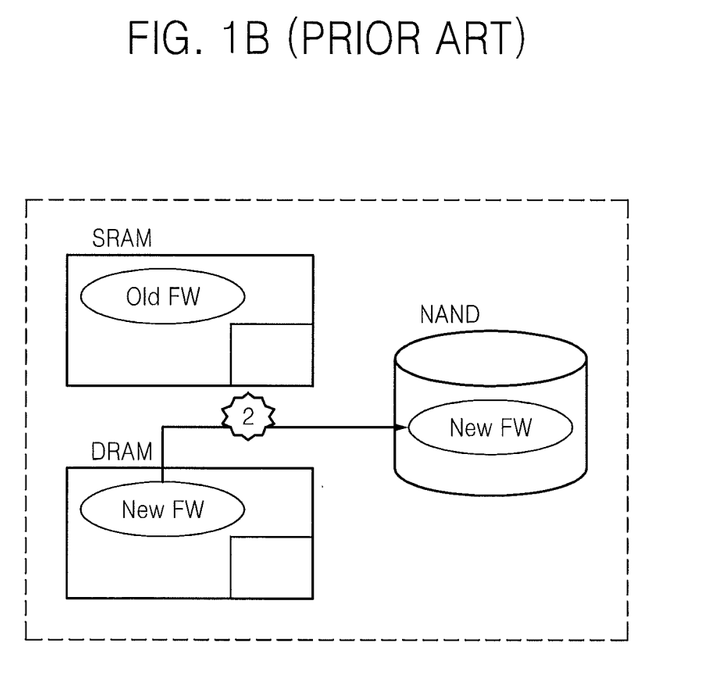
Figure 1C:
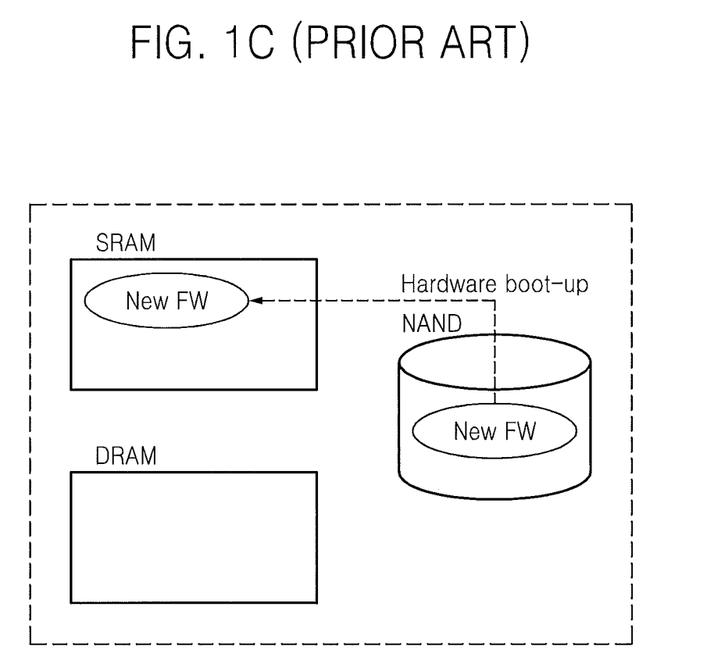

FIGS. 1A through 1C are diagrams for explaining a conventional firmware updating method. In more detail, FIGS. 1A through 1C illustrate a conventional method of updating a firmware of a solid state disk (SSD) that uses a NAND flash memory as a storage medium. Referring to FIGS. 1A through 1C, an old firmware is loaded on a high-speed memory such as a static random access memory (SRAM) and operates. The SSD may include a dynamic random access memory (DRAM). A part of the SRAM and a part of the DRAM may be used to store context information.

The context information may include mapping information and/or cache information for managing information about NAND flash memory. The mapping information may denote information about mapping between a logical address space and a physical space in which information is actually stored, wherein the information about the mapping is required because of the characteristics of NAND flash memories. Since recent SSDs provide a logical space of several tens to several hundreds of gigabytes, the mapping information itself has a size that reaches several tens of megabytes. Such mapping information is retained on a high-speed memory such as a SRAM and/or a DRAM when the SSD is under operation. However, the mapping information needs to be stored in a NAND flash memory when the SSD is powered off, and needs to be restored when the SSD is powered on.

The cache information may denote information for using a caching (or buffering) technique based on a considerable difference between a speed at which a host accesses the NAND flash memory and a speed at which the host accesses the SRAM or the DRAM. The cache information also needs to be stored in the NAND flash memory. This storing operation is referred to as flush.

The old firmware starts updating when a new firmware received from a host has been stored in a memory such as a DRAM. When the updating starts, the SSD may not normally operate. Accordingly, in applications where the accessibility to a device is important as in a sever environment, how fast the updating is completed to resume a normal operation is an important characteristic of the SSD.

Firmware may be loaded from a specific region of the NAND flash memory to the SRAM when the SSD is powered on. Accordingly, to update the firmware, as illustrated in FIG. 1A, the new firmware stored in the DRAM is loaded into the NAND flash memory, and thus a firmware image stored in the NAND flash memory is changed from an old firmware to a new firmware. FIG. 1B illustrates a state in which the firmware image stored in the NAND flash memory has been changed from an old firmware to a new firmware.

In some methods of allowing a new firmware to drive the SSD after the new firmware is stored in the NAND flash memory, a hardware reset is applied so that a hardware boot logic loads the new firmware into the SRAM and performs a system initialization code. This method is illustrated in FIG. 1C.

Although this method may be very simply implemented, context information retained in the volatile memory such as the SRAM and the DRAM may be lost as illustrated in FIG. 1C. Thus, only after context information is stored in the NAND flash memory, the context information should be read again from the NAND flash memory and interpreted to be restored and updated in a system initialization process, and then the updated context information needs to be loaded into the volatile memory.

Even if the old firmware directly copies the new firmware into a SRAM and performs a system initialization code in order to maintain the context information retained in the volatile memory, it may be difficult to know if the new firmware may use the old information. Thus, as in a case where a hardware reset is used, all of the context information needs to undergo the above-described system initialization process. In other words, after all of the context information are stored in the NAND flash memory, they need to be read therefrom and interpreted to be updated to correspond to the new firmware, and then the updated context information needs to be loaded to the volatile memory.

In contrast with the above-described conventional method, in a method of updating the firmware of a memory apparatus according to an embodiment of the present invention, only context information required to be initialized undergoes an initialization process instead that all of the context information undergo initialization.

To achieve this, the memory apparatus according to an embodiment of the present invention may use version information of a firmware.

Figure 2:
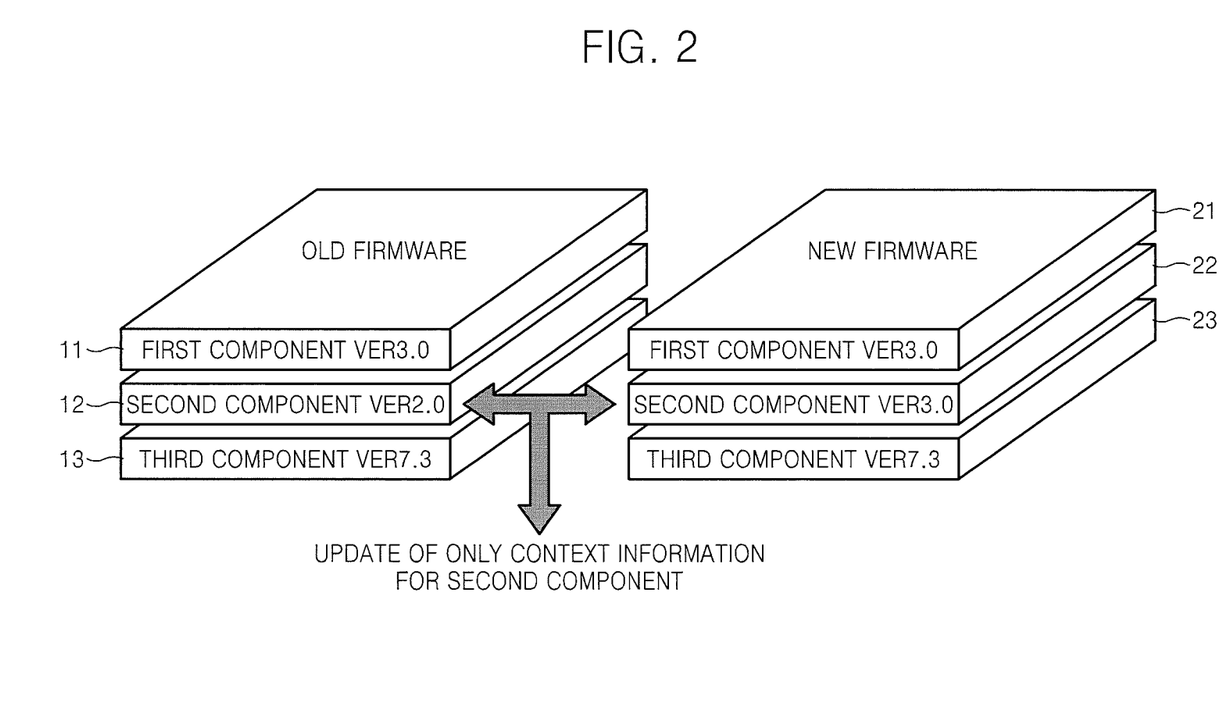
FIG. 2 is a diagram for explaining a use of version information for each component of a firmware of a memory apparatus in order to implement a method of updating the firmware of the memory apparatus according to an embodiment of the present invention.

FIG. 2 is a diagram for explaining a use of version information for each component of a firmware of the memory apparatus in order to implement the method of updating the firmware of a memory apparatus according to an embodiment of the present invention. Referring to FIG. 2, an old firmware may have a plurality of components, namely, first, second, and third components 11, 12, and 13, and a new firmware may have a plurality of components, namely, first, second, and third components 21, 22, and 23. Each of the components 11, 12, 13, 21, 22, and 23 may be at least one file and/or module that performs an independent function, and may include separate version information. The version information may be included in a version table included in each of the old firmware and the new firmware.

For example, each of the old firmware and the new firmware may be formed of 3 components. As described above, the old firmware may be formed of the first component 11, the second component 12, and the third component 13. As illustrated in FIG. 2, the first component 11 may be version 3.0, the second component 12 may be version 2.0, and the third component 13 may be version 7.3. The new firmware may be formed of the first component 21, the second component 22, and the third component 23. As illustrated in FIG. 2, the first component 21 may be version 3.0, the second component 22 may be version 3.0, and the third component 23 may be version 7.3.

In other words, the new firmware may be a result of updating of only the second component of the old firmware. Thus, in the method of updating the firmware of the memory apparatus according to an embodiment of the present invention, only context information corresponding to the second component 12 of the old firmware may undergo the initialization process, and context information corresponding to the first and third components 1 and 3 may be directly used in the new firmware without undergoing the initialization process. Accordingly, only necessary context information is initialized, resulting in reduction of the updating time.

FIGS. 3A through 3D are diagrams for explaining the concept of a firmware updating method performed in a memory apparatus 100 according to an embodiment of the present invention. Referring to FIGS. 3A through 3D, the memory apparatus 100 includes at least one volatile memory, namely, first and second volatile memories 120 and 130, and a non-volatile memory 110. The volatile memories 120 and 130 may include a SRAM and/or a DRAM. The non-volatile memory 110 may be implemented into a NAND flash memory. Although a case where the memory apparatus 100 is an Solid State Disk (SSD) is illustrated for convenience of explanation, the method of updating the firmware of the memory apparatus according to an embodiment of the present invention may be easily applied to any memory apparatus that includes at least one volatile memory and uses a non-volatile memory as a storage medium.

Figure 3A:
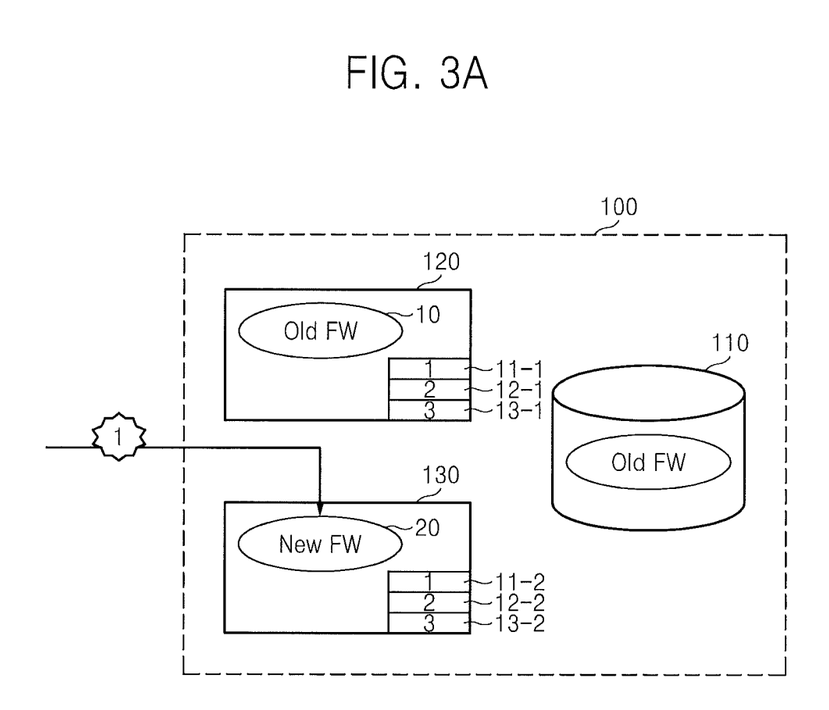
FIGS. 3A through 3D are diagrams for explaining the concept of the method of updating the firmware of the memory apparatus according to an embodiment of the present invention.

First, an old firmware 10 may be loaded into the first volatile memory 120 (for example, an SRAM) and driven therein. An image of the old firmware 10 may be stored in the non-volatile memory 110 (for example, a NAND flash memory). Then, the second volatile memory 130 (for example, a DRAM) may receive a new firmware 20 from a host (not shown). Each of the old firmware 10 and the new firmware 20 may include 3 components. Then, as illustrated in FIG. 3A, all of the context information 11-1, 12-1, 13-1, 11-2, 12-2, and 13-2 used in the old firmware 10 may be stored in the first volatile memory 120 and/or the second volatile memory 130.

Then, the old firmware 10 may check what component of the new firmware 20 has been updated. To achieve this checking, the old firmware 10 may compare version information for its own components with version information for components of the new firmware 20. Thereafter, the old firmware 10 may store update information representing information about updated components or non-updated components in a predetermined location in the first volatile memory 120 as illustrated in FIG. 4.

If component 2 is an updated component, only the context information 12-1 and 12-2 corresponding to the component 2 undergo an initialization process, and the other context information 11-1, 13-1, 11-2, and 13-2 are used without changes.

Figure 3B:
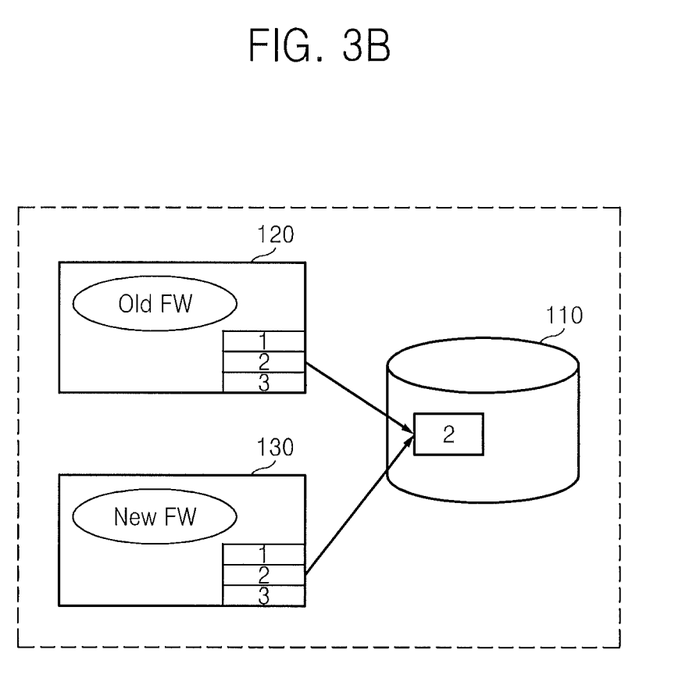
Figure 3C:
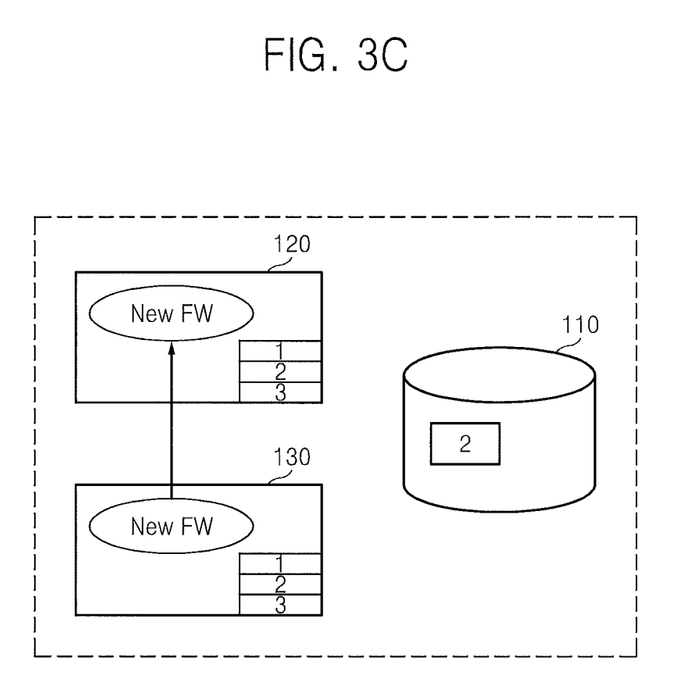
Figure 3D:
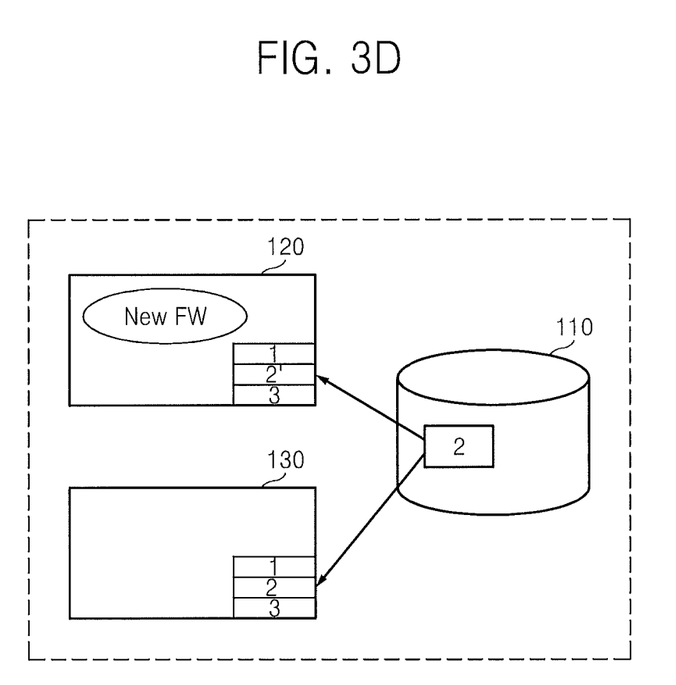

To this end, the old firmware 10 may store the context information 12-1 and 12-2 corresponding to the component 2 in the non-volatile memory 110. Then, the memory apparatus 100 may have a state as illustrated in FIG. 3B. Thereafter, as illustrated in FIG. 3C, the new firmware 20 may be copied into the first volatile memory 120. The new firmware 20 performs a system restart without performing a hardware reset, whereby the system initialization code is executed. Then, the system initialization code enables the context information 12-1 and 12-2 corresponding to the updated component 2, which are stored in the non-volatile memory 110, to undergo the initialization process. To this end, the system initialization code may read and interpret the context information 12-1 and 12-2 to update the context information 12-1 and 12-2 to correspond to the new firmware 20. The memory apparatus 100 on which the initialization process has been performed may be as illustrated in FIG. 3D.

Figure 4:
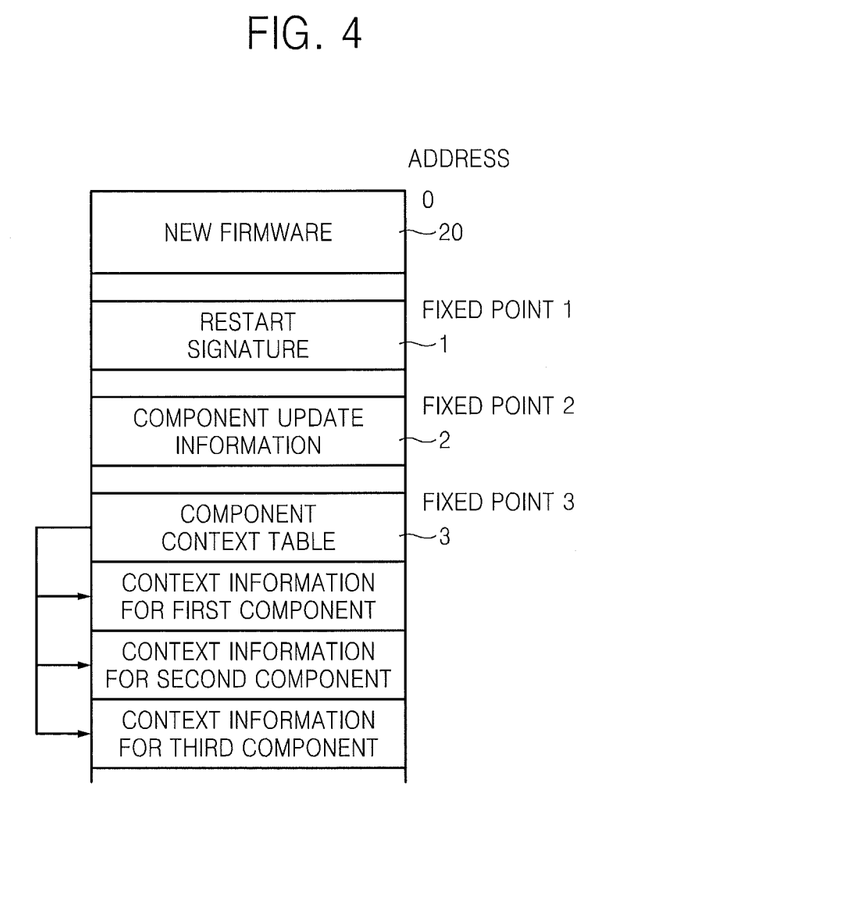
FIG. 4 illustrates a structure of a first volatile memory when system initialization is performed in the method illustrated in FIGS. 3A through 3D.

FIG. 4 illustrates a structure of the first volatile memory 120 when system initialization is performed in the method illustrated in FIGS. 3A through 3D.

Referring to FIG. 4, the system initialization code needs to be able to determine whether the system restart is a restart to update firmware according to the method of updating the firmware of the memory apparatus according to an embodiment of the present invention or the system restart is a general power-on operation, which is performed after a power-off operation. To this end, according to an embodiment of the present invention, the old firmware 10 records predetermined information in a specific location in the first volatile memory 120 in order to enable the system initialization code to determine whether the system restart is the restart according to an embodiment of the present invention or the general power-on operation. The predetermined information 1 records a predetermined signature sequence that cannot be accidentally reproduced, in order to enable the new firmware 20 to recognize that the firmware 20 is in a state having to perform the restart according to an embodiment of the present invention, while performing the system initialization code.

In order for the components of the new firmware 20 to refer to context information generated by the old firmware 10, a change in the structure of the context information whenever the firmware is updated may not occur. Thus, the structural change of the context information may be managed by the version information of a corresponding component.

Component update information 2 is generated by the old firmware 10, and may include information about components updated by firmware update or information about components non-updated by the firmware update. In addition, a method allowing the new firmware 20 to recognize the location of the context information generated by the old firmware 10 is needed. A simple method allowing the new firmware 20 to recognize the location of the context information is to manage the context information for each component to be always stored in a determined location on a memory by using a link tool. However, this simple method may make the use of a memory area inconvenient and may impose restrictions on a change of the context information. Thus, according to an embodiment of the present invention, only a component context table 3 representing the location of each context information may be placed in a specific location, and the new firmware 20 may access the context information by referring to the component context table 3.

As shown in FIG. 4, the restart signature 1, the component update information 2, and the component context table 3 may be stored in fixed locations, namely, fixed points 1, 2, and 3, respectively.

Figure 5:
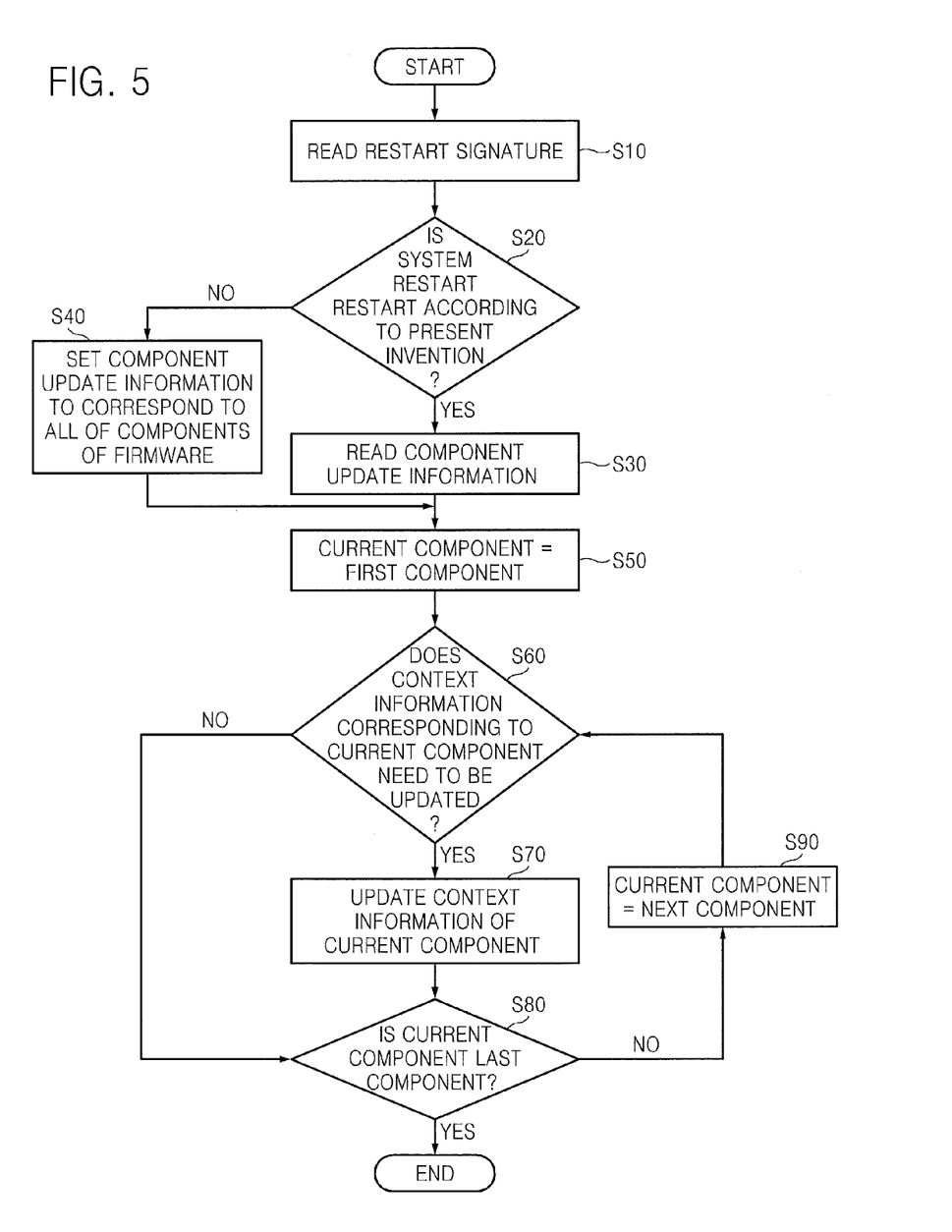
FIG. 5 is a flowchart of a method of updating a firmware of the memory apparatus according to an embodiment of the present invention.

FIG. 5 is a flowchart of a method of updating a firmware of a memory apparatus, according to an embodiment of the present invention. Referring to FIGS. 4 and 5, in operation S10, the system initialization code included in the new firmware 20 reads the restart signature 1. In operation S20, it is determined based on the restart signature 1 whether the system restart is the restart according to an embodiment of the present invention or the general power-on operation. If it is determined in operation S20 that a system initialization code is performed based on the general power-on operation, context information corresponding to all of the components of the firmware need to undergo the initialization process. Accordingly, the component update information 2 may be set to correspond to all of the components of the firmware, in operation S40.

On the other hand, if it is determined in operation S20 that the system initialization code is performed based on the restart according to an embodiment of the present invention, the system initialization code reads the component update information 2, in operation S30. In other words, information about updated components may be read out.

Thereafter, the components of the firmware starting from a first component are sequentially considered as a current component in operations S50 and S90, and it is determined whether context information corresponding to the current component needs to be updated through the initialization process by referring to the component update information 2, in operation S60. If the context information corresponding to the current component needs to be updated, the context information may be updated through the initialization process, in operation S70. Information about a location of the updated context information may be recorded in a context table. An operation S80 is repeatedly performed with respect to from the first component to the last component. Thus, the firmware update is concluded.

In a memory apparatus and a firmware updating method performed in the memory apparatus according to the present invention, an operation of storing and recovering context information may be minimized, whereby the firmware updating time may be reduced.

The firmware updating method performed in the memory apparatus according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood that various changes in form and details may be made therein without departing from the spirit and scope of the following claims.

What is claimed is:

1. A method of updating firmware included in a memory apparatus comprising a first volatile memory, a second volatile memory, and a non-volatile memory the method comprising:
   storing new firmware in the second volatile memory when old firmware is loaded into the first volatile memory;
   determining on a component basis which of a plurality of components of the old firmware is an updated component in the new firmware;
   and writing context information only for updated components in the new firmware to the non-volatile memory
   wherein the context information comprises at least one of mapping information for the non-volatile memory and cache information,
   and further wherein no context information for the old firmware is stored on the non-volatile memory prior to the writing.

2. The method of claim 1 further comprising:
   storing context information corresponding to the updated component in the non\-volatile memory; and
   avoiding storing context information corresponding to a remainder of the plurality of components of the of the old firmware in the non-volatile memory.

3. The method of claim 1, wherein the determining comprises:
   comparing version information for each of the components of the new firmware with version information corresponding to the components of the old firmware; and
   if the version information for the old firmware is different from the version information for the new firmware, copying updated information corresponding to the component updated in the new firmware from the second volatile memory directly into the first volatile memory without writing into the non-volatile memory.

4. The method of claim 2, further comprising storing predetermined restart information in the second volatile memory by executing the new firmware stored in the second volatile memory,
   wherein if the predetermined restart information is stored in the second volatile memory, context information corresponding to the updated component is updated, and if the predetermined restart information is not stored in the second volatile memory, all of context information corresponding to the components are updated.

5. The method of claim 4, wherein, if the predetermined restart information is not stored in the second volatile memory, the new firmware sets update information so that the update information corresponds to all of the components.

6. The method of claim 2, wherein at least one of the old firmware and the new firmware accesses context information corresponding to each of the components by referring to a context table including information about locations in which context information corresponding to the components are stored.

7. The method of claim 1, wherein the first volatile memory, the second volatile memory, and the non-volatile memory are a Static Random Access Memory (SRAM), a Dynamic Random Access Memory (DRAM), and a NAND flash memory, respectively.

8. The method of claim 1, wherein the memory apparatus comprises a Solid State Disk (SSD).

9. A memory apparatus comprising:
   at least one volatile memory;
   and a non-volatile memory,
   wherein the memory apparatus updates firmware located in the at least one volatile memory from an old firmware to a new firmware by
   determining on a component basis which of a plurality of components of the old firmware stored on at least one volatile memory is an updated component in the new firmware;
   only writing that part of context information corresponding to a new component of the firmware to the non-volatile memory
   wherein the context information comprises at least one of mapping information for the non-volatile memory and cache information,
   and further wherein no context information of the old firmware is stored on the non-volatile memory prior to the writing.

10. A method of operating a memory apparatus comprising a first volatile memory, a second volatile memory, and a non-volatile memory, the method comprising:
    reading a restart signature to determine if a general power-on operation is to be performed;
    and updating only components of old firmware indicated as being updated in new firmware if the restart signature indicates a general power-on is not to be performed
    determining on a component basis which of a plurality of components of an old firmware stored on at least one volatile memory is an updated component in the new firmware;
    only writing that part of context information corresponding to a new component of the firmware to the non-volatile memory
    wherein the context information comprises at least one of mapping information for the non-volatile memory and cache information,
    and further wherein no context information for the old firmware is stored on the non-volatile memory prior to the writing.

11. The method of claim 10 further comprising wherein updating all components of the old firmware regardless of which are indicated as being updated in the new firmware if the restart signature indicates the general power-on is to be performed.

12. The method of claim 11 wherein updating only the components of the old firmware comprises reading component update information from the new firmware.

13. The method of claim 12 wherein reading the restart signature comprises reading the restart signature from the first volatile memory.

* * * * *